United States Patent
Shin et al.

(10) Patent No.: US 11,539,043 B2
(45) Date of Patent: Dec. 27, 2022

(54) NEGATIVE ACTIVE MATERIAL, LITHIUM BATTERY INCLUDING THE NEGATIVE ACTIVE MATERIAL, AND METHOD OF PREPARING THE NEGATIVE ACTIVE MATERIAL

(71) Applicant: SAMSUNG SDI CO., LTD., Yongin-si (KR)

(72) Inventors: Changsu Shin, Yongin-si (KR); Hyunki Park, Yongin-si (KR); Uisong Do, Yongin-si (KR); Sangeun Park, Yongin-si (KR); Sungsu Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 623 days.

(21) Appl. No.: 14/817,134

(22) Filed: Aug. 3, 2015

(65) Prior Publication Data
US 2016/0043390 A1    Feb. 11, 2016

(30) Foreign Application Priority Data
Aug. 8, 2014  (KR) .................. 10-2014-0102618

(51) Int. Cl.
*H01M 4/36*    (2006.01)
*H01M 10/0525*    (2010.01)
(Continued)

(52) U.S. Cl.
CPC ........... *H01M 4/366* (2013.01); *H01M 4/386* (2013.01); *H01M 4/587* (2013.01); *H01M 10/0525* (2013.01)

(58) Field of Classification Search
CPC ...... H01M 4/366; H01M 4/386; H01M 4/587; H01M 10/0525
See application file for complete search history.

(56) References Cited

U.S. PATENT DOCUMENTS

| | | | |
|---|---|---|---|
| 7,972,727 | B2 | 7/2011 | Christensen et al. |
| 9,123,955 | B2 | 9/2015 | Kwon et al. |
| (Continued) | | | |

FOREIGN PATENT DOCUMENTS

| | | |
|---|---|---|
| KR | 10-0589367 B1 | 6/2006 |
| KR | 10-2010-0028766 A | 3/2010 |
| (Continued) | | |

OTHER PUBLICATIONS

Lee, Heon-Young, and Sung-Man Lee. "Graphite-FeSi alloy composites as anode materials for rechargeable lithium batteries." Journal of Power Sources 112.2 (2002): 649-654.*
(Continued)

*Primary Examiner* — Stewart A Fraser
*Assistant Examiner* — Claire L Roe
(74) *Attorney, Agent, or Firm* — Lewis Roca Rothgerber Christie LLP

(57) ABSTRACT

A negative active material, a lithium battery including the negative active material, and a method of preparing the negative active material. The negative active material includes: a core particle including a silicon based alloy; carbon nanoparticles disposed on a surface of the core particle; and an amorphous carbonaceous coating layer disposed on at least a portion of a surface of the core particle. The negative active material may improve the lifetime characteristics of the lithium batteries.

17 Claims, 6 Drawing Sheets

(51) Int. Cl.
*H01M 4/38* (2006.01)
*H01M 4/587* (2010.01)

(56) References Cited

U.S. PATENT DOCUMENTS

| | | | |
|---|---|---|---|
| 9,966,594 B2 | 5/2018 | Kim et al. | |
| 2007/0122710 A1* | 5/2007 | Kwon | H01M 4/133 |
| | | | 429/232 |
| 2009/0169994 A1* | 7/2009 | Mah | H01M 4/364 |
| | | | 429/218.1 |
| 2009/0179181 A1 | 7/2009 | Zhang et al. | |
| 2009/0269669 A1* | 10/2009 | Kim | H01M 4/587 |
| | | | 429/231.8 |
| 2010/0176337 A1* | 7/2010 | Zhamu | H01M 4/1391 |
| | | | 252/182.1 |
| 2011/0123866 A1* | 5/2011 | Pan | H01M 4/505 |
| | | | 429/221 |
| 2011/0281180 A1* | 11/2011 | Kim | H01M 4/133 |
| | | | 429/338 |
| 2012/0070745 A1* | 3/2012 | Ishida | H01M 4/38 |
| | | | 429/231.8 |
| 2013/0059203 A1* | 3/2013 | Hong | H01M 4/38 |
| | | | 977/734 |
| 2013/0115517 A1* | 5/2013 | Kim | H01M 4/134 |
| | | | 429/231.8 |
| 2013/0136995 A1* | 5/2013 | Cho | A23L 7/10 |
| | | | 429/231.8 |
| 2013/0196233 A1* | 8/2013 | Moon | H01M 4/386 |
| | | | 429/221 |
| 2013/0234074 A1* | 9/2013 | Gilles | B22F 1/0011 |
| | | | 252/504 |
| 2013/0337325 A1* | 12/2013 | Jung | H01M 10/0525 |
| | | | 429/218.1 |
| 2013/0344391 A1* | 12/2013 | Yushin | H01M 4/366 |
| | | | 429/231.8 |
| 2014/0170498 A1* | 6/2014 | Park | B82Y 30/00 |
| | | | 429/218.1 |
| 2014/0272572 A1* | 9/2014 | Chu | H01M 4/386 |
| | | | 429/215 |
| 2017/0104210 A1* | 4/2017 | Shin | H01M 4/485 |

FOREIGN PATENT DOCUMENTS

| | | | |
|---|---|---|---|
| KR | 10-2011-0008157 A | | 1/2011 |
| KR | 10-1063239 B1 | | 9/2011 |
| KR | 10-2013-0004536 A | | 1/2013 |
| KR | 20130016727 A | * | 2/2013 |
| KR | 10-2013-0114007 A | | 10/2013 |

OTHER PUBLICATIONS

Xue, Leigang, et al. "Carbon-coated Si nanoparticles dispersed in carbon nanotube networks as anode material for lithium-ion batteries." ACS applied materials & interfaces 5.1 (2012): 21-25.*
English machine translation of Shin et al. (KR-20130016727-A) (Year: 2013).*
Notice of Allowance for Korean Patent Application No. 10-2014-0102618, dated Jan. 20, 2021, 10 pages.
Korean Office Action dated Sep. 11, 2020, issued in corresponding Korean Patent Application No. 10-2014-0102618 (53 pages).

* cited by examiner

NEGATIVE ACTIVE MATERIAL, LITHIUM BATTERY INCLUDING THE NEGATIVE ACTIVE MATERIAL, AND METHOD OF PREPARING THE NEGATIVE ACTIVE MATERIAL

CROSS-REFERENCE TO RELATED APPLICATION

This application claims priority to and the benefit of Korean Patent Application No. 10-2014-0102618, filed on Aug. 8, 2014, in the Korean Intellectual Property Office, the disclosure of which is incorporated herein in its entirety by reference.

BACKGROUND

1. Field

One or more exemplary embodiments relate to a negative active material, a lithium battery including the negative active material, and a method of preparing the negative active material.

2. Description of the Related Art

Lithium secondary batteries produce electrical energy by oxidation and reduction reactions when lithium ions undergo intercalation/deintercalation in positive and negative electrodes, in which the lithium ions move through an organic electrolytic solution and/or a polymer electrolytic solution filled between the positive and negative electrodes, and the electrodes include active materials capable of intercalation and deintercalation of lithium ions.

Studies have been made on negative active materials for lithium secondary batteries including various forms of carbonaceous materials (such as artificial graphite, natural graphite, or hard carbon capable of intercalation/deintercalation of lithium), and non-carbonaceous materials (such as Si or Sn).

Although the non-carbonaceous materials such as Si or Sn may have very high capacities (because the capacity densities thereof are 10 times or more higher than that of graphite), the capacities may rapidly decrease due to volume expansion during charging and discharging processes. Therefore, various alloys and complexes are currently being studied to address this problem.

SUMMARY

An aspect according to one or more exemplary embodiments is directed toward a negative active material including a silicon based alloy that is capable of improving lifetime characteristics of lithium batteries.

An aspect according to one or more exemplary embodiments is directed toward a negative electrode including the negative active material.

An aspect according to one or more exemplary embodiments is directed toward a lithium battery including the negative electrode.

An aspect according to one or more exemplary embodiments is directed toward a method of preparing the negative active material.

Additional aspects will be set forth in part in the description which follows and, in part, will be apparent from the description, or may be learned by practice of the presented embodiments.

According to one or more exemplary embodiments, a negative active material includes: a core particle including a silicon based alloy; carbon nanoparticles on a surface of the core particle; and an amorphous carbonaceous coating layer on at least a portion of the surface of the core particle.

The carbon nanoparticles may have an average particle diameter of about 1/10 or less of that of the core particle. For example, the carbon nanoparticles may have an average particle diameter ranging from about 1/1000 to about 1/10 of that of the core particle. For example, the carbon nanoparticles may have an average particle diameter ranging from about 1/100 to about 1/50 of that of the core particle.

The core particle may have an average particle diameter ranging from about 1 μm to about 10 μm.

The carbon nanoparticles may be amorphous carbon particles with an average particle diameter of about 10 nm to about 100 nm.

The silicon based alloy may be represented by the following Formula 1:

$Si_aM_b$                                    Formula 1 wherein, M includes at least one selected from the group consisting of group 2 to 14 metal elements other than silicon, and wherein $0.5 \leq a \leq 0.9$, $0.1 \leq b \leq 0.5$, and $a+b=1$.

M may include at least one selected from the group consisting of iron (Fe), copper (Cu), magnesium (Mg), chromium (Cr), nickel (Ni), zinc (Zn), manganese (Mn), cobalt (Co), titanium (Ti), germanium (Ge), calcium (Ca), and aluminum (Al).

The silicon based alloy may be represented by $Si_aFe_b$, wherein $0.5 \leq a \leq 0.9$, $0.1 \leq b \leq 0.5$, and $a+b=1$.

The silicon based alloy may include: an inactive matrix including silicon and at least one selected from the group consisting of group 2 to 14 metal elements other than silicon; and active silicon nanoparticles dispersed in the inactive matrix.

The amorphous carbonaceous coating layer may include a carbide of a carbon precursor selected from the group consisting of hydrocarbons, soft carbons, hard carbons, coal, coal based pitch, petroleum based pitch, mesophase pitch, coal based oil, petroleum based heavy oil, organic synthetic pitch, and combinations thereof.

The amorphous carbonaceous coating layer may surround the surface of the core particle and may cover the carbon nanoparticles.

The amorphous carbonaceous coating layer may have a thickness of about 0.1 μm to about 10 μm.

An amount of the amorphous carbonaceous coating layer may be 1 part to about 30 parts based on 100 parts by weight of the core particle.

According to one or more exemplary embodiments, a negative electrode includes the negative active material.

According to one or more exemplary embodiments, a lithium battery includes the negative electrode.

According to one or more exemplary embodiments, a method of preparing a negative active material includes: mixing carbon nanoparticles with a core particle including a silicon based alloy to obtain a first particle in which the carbon nanoparticles are adhered onto a surface of the core particle; mixing the first particle with an amorphous carbon precursor to obtain a second particle in which the amorphous carbon precursor is coated on a surface of the first particle; and heat-treating the second particle at a temperature of about 500° C. to about 700° C. in an inert atmosphere.

The silicon based alloy may be represented by the following Formula 1:

$Si_aM_b$                                    Formula 1 wherein, M includes at least one selected from the group consisting of group 2 to 14 metal elements other than silicon, and wherein 0.5≤a≤0.9, 0.1≤b≤0.5, and a+b=1.

M may include at least one selected from the group consisting of iron (Fe), copper (Cu), magnesium (Mg), chromium (Cr), nickel (Ni), zinc (Zn), manganese (Mn), cobalt (Co), titanium (Ti), germanium (Ge), calcium (Ca), and aluminum (Al).

The silicon based alloy may be represented by $Si_aFe_b$, wherein 0.5≤a≤0.9, 0.1≤b≤0.5, and a+b=1.

For example, the carbon nanoparticles may be amorphous carbon particles having a nanoparticle size of about 100 nm or less, or about 10 nm to about 100 nm.

The amorphous carbon precursor may include a carbon precursor selected from the group consisting of hydrocarbons, soft carbons, hard carbons, coal, coal based pitch, petroleum based pitch, mesophase pitch, coal based oil, petroleum based heavy oil, organic synthetic pitch, and combinations thereof.

The heat-treating of the second particle may be performed at a temperature of about 500° C. to about 600° C. in a nitrogen atmosphere.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
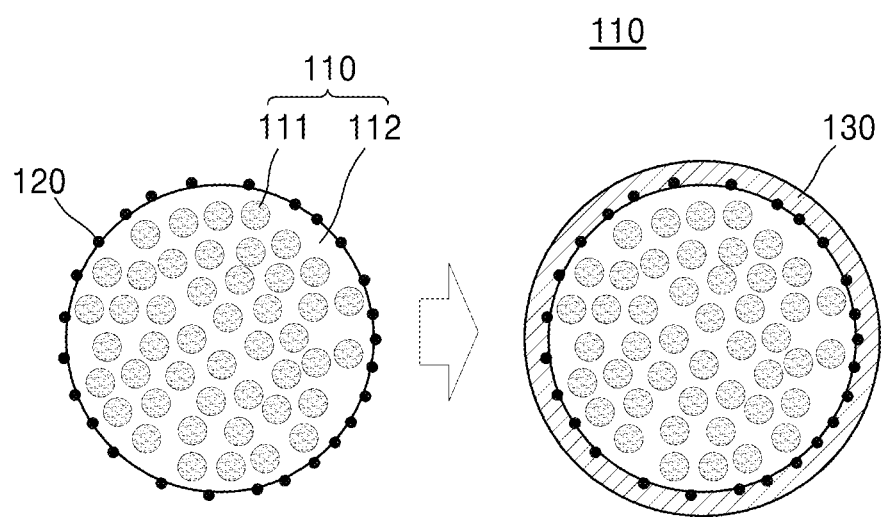
FIG. 1 is a schematic view showing a process of forming a negative active material according to one or more exemplary embodiments.

Reference will now be made in more detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of", when preceding a list of elements, modify the entire list of elements and do not modify the individual elements of the list.

Hereinafter, the present disclosure is described in more detail.

A negative active material according to one or more exemplary embodiments includes: a core particle including a silicon based alloy; carbon nanoparticles disposed on a surface of the core particle; and an amorphous carbonaceous coating layer disposed on at least a portion of the surface of the core particle.

A process of forming the negative active material according to one or more exemplary embodiments is illustrated in FIG. 1.

Referring to FIG. 1, the negative active material 100 has a structure in which carbon nanoparticles 120 are first disposed on the surface of a core particle 110 including a silicon based alloy, and then an amorphous carbonaceous coating layer 130 is coated on the surface of the core particle 110. Here, according to one or more exemplary embodiments, the core particle 110 may include an inactive matrix 112 and active silicon nanoparticles 111 dispersed in the inactive matrix 112. This will be described later in more detail.

The expression "silicon based" refers to a silicon based alloy that includes at least about 50% by weight of silicon (Si). For example, the silicon based alloy may include at least about 60% by weight, about 70% by weight, about 80% by weight, or about 90% by weight of Si. Further, the silicon based alloy may include at least one of Group 2 to 14 metal elements together with silicon (Si).

According to one or more exemplary embodiments, the silicon based alloy included in the core particle 110 may be represented by the following Formula 1:

$$Si_aM_b \qquad \text{Formula 1}$$

wherein, M includes at least one selected from group 2 to 14 metal elements except silicon, and wherein 0.5≤a≤0.9, 0.1≤b≤0.5, and a+b=1.

According to one or more exemplary embodiments, M may include at least one selected from iron (Fe), copper (Cu), magnesium (Mg), chromium (Cr), nickel (Ni), zinc (Zn), manganese (Mn), cobalt (Co), titanium (Ti), germanium (Ge), calcium (Ca), and aluminum (Al).

According to one or more exemplary embodiments, the silicon based alloy may be represented by $Si_aFe_b$, wherein 0.5≤a≤0.9, 0.1≤b≤0.5, and a+b=1.

According to one or more exemplary embodiments, the silicon based alloy may include: an inactive matrix 112 including inert silicon, and at least one of Group 2 to 14 metal elements except silicon; and active silicon nanoparticles 111 dispersed in the inactive matrix 112.

Silicon in the silicon based alloy may be categorized as either inert silicon or active silicon. Here, since the active silicon is capable of performing a reversible reaction with lithium ions (e.g., intercalation/deintercalation of lithium ions), the active silicon is directly related with capacities of the silicon based alloy; and the inert silicon plays a role of suppressing volume expansions of the silicon based alloy while forming an inactive matrix structure (together with the Group 2 to 14 metal elements) which does not react with lithium ions. The active silicon is precipitated and dispersed in the form of nanoparticles in such an inactive matrix. The active silicon nanoparticles may be crystalline or amorphous.

The active silicon nanoparticles 111 may be included in the silicon based alloy in a range of about 30 atomic % to about 50 atomic % based on 100 atomic % of the total silicon based alloy. In one embodiment, when the active silicon nanoparticles 111 are included in the silicon based alloy in the range described above, volume expansions of the silicon based alloy are effectively suppressed when charging and discharging the electrodes including the active silicon nanoparticles 111, and the electrodes exhibit suitable (e.g., excellent) capacity characteristics.

The active silicon nanoparticles 111 may have an average particle diameter range of about 1 nm to about 100 nm. For example, the active silicon nanoparticles 111 may have an average particle diameter range of about 10 nm to about 100 nm.

The average particle diameter range of the active silicon nanoparticles 111 may be obtained from Scherrer's equation utilizing a full width at half maximum of a peak with respect to a Si (111) surface in an X-ray diffraction spectrum utilizing a CuK-alpha characteristic X-ray with a wavelength of 1.541 Å.

The active silicon nanoparticles 111 having the average particle diameter range described above are uniformly distributed in an inactive matrix 112 such that volume expansion of the active silicon nanoparticles 111 may be efficiently buffered by the inactive matrix 112 surrounding the active silicon nanoparticles 111 during charge/discharge cycles.

On the other hand, the inactive siliconforms an inactive matrix 112 while forming a binary alloy phase together with Group 2 to 14 metal elements that are metal components other than Si. For example, the inactive matrix 112 may include a binary alloy phase represented by $Si_2M$, wherein M includes at least one selected from Fe, Cu, Mg, Cr, Ni, Zn, Mn, Co, Ti, Ge, Ca, and Al. For example, the inactive matrix 112 may include $Si_2Fe$.

According to one or more exemplary embodiments, the core particle 110 including the silicon based alloy may have an average particle diameter range of about 0.5 μm to about 10 μm. For example, the core particle 110 may have an average particle diameter range of about 1 μm to about 10 μm, about 1 μm to about 5 μm, or about 2.5 μm to about 5 μm. In one embodiment, when the average particle diameter is within the average particle diameter ranges described above, the core particle 110 suppresses the reactivity with an electrolyte such that cycle characteristics are improved and the dispersion stability is improved when forming negative electrode slurry.

Here, an average particle diameter of the core particle 110 refers to a particle diameter D50, a particle size value corresponding to 50% of the amount of particles when the total number of particles is 100% in a distribution curve on which particle diameters are accumulated in the order from the smallest particle size to the largest particle size. D50 may be measured by any suitable method, such as methods that are known to those of ordinary skill in the art. For example, D50 may be measured by a particle size analyzer or maybe measured from a TEM photograph or an SEM photograph. Another example of the methods may include measuring particle diameters by a measuring device utilizing dynamic light-scattering, performing a data analysis process to count the number of particles with respect to each particle size range, and obtaining (e.g., easily obtaining) D50 from the counted particle numbers through the calculation.

Carbon nanoparticles 120 are disposed on the surface of the core particle 110 including the silicon based alloy.

According to one or more exemplary embodiments, the carbon nanoparticles 120 may have an average particle diameter corresponding to about $1/10$ or less of the average particle diameter of the core particle 110. For example, the carbon nanoparticles 120 may have an average particle diameter ranging from about $1/1000$ to about $1/10$ of the average particle diameter of the core particle 110. In one embodiment, the carbon nanoparticles 120 may have an average particle diameter ranging from about $1/100$ to about $1/50$ of the average particle diameter of the core particle 110. Within the average particle diameter ranges described above, electrons are smoothly moved to the core particle 110 through the carbon nanoparticles 120 such that electrical conductivity of a negative active material may be improved, and capacity retention rate of a lithium battery may be improved accordingly.

According to one or more exemplary embodiments, the carbon nanoparticles 120 may be amorphous. Nano-sized carbon nanoparticles 120 are more inclined to be amorphous as sizes of the carbon nanoparticles 120 become smaller.

The carbon nanoparticles 120 may have a plate shape, a spherical shape, a fibrous shape, a powder shape, etc. However, the shapes of the carbon nanoparticles 120 are not particularly limited.

For example, the carbon nanoparticles 120 may be amorphous carbon particles having a size (e.g., nanosize) of about 100 nm or less, or about 10 nm to about 100 nm. The amorphous carbon particles are in a state of powder (e.g., powders), which are the materials remained after primarily processing of crude oil and/or coal, from which a substantial amount of organic material has been removed by performing the purification process several times. For example, the carbon nanoparticles 120 may include an amorphous carbon formed utilizing crude oil, natural gas, acetylene gas, etc. In one embodiment, the carbon nanoparticles 120 may include carbon black obtained by spraying and vaporizing crude oil, natural gas, acetylene gas, etc at a temperature of about 1600° C. to about 2000° C.

An amorphous carbonaceous coating layer 130 is coated on at least a portion of the surface of the core particle 110. For example, as it can be seen from FIG. 1, the amorphous carbonaceous coating layer 130 may surround the entire surface of the core particle 110 while covering the carbon nanoparticles 120.

According to one or more exemplary embodiments, the amorphous carbonaceous coating layer 130 may include carbides of carbon precursors selectedfrom hydrocarbons, soft carbons, hard carbons, coal, coal based pitch, petroleum based pitch, mesophase pitch, coal based oil, petroleum based heavy oil, organic synthetic pitch, and combinations thereof. For example, the hydrocarbons may include polymer resins such as phenolic resins, furan resins, polyamide resins, etc.

Although methods for coating the amorphous carbonaceous coating layer 130 are not limited, the methods may include both a dry coating method and a wet coating method. Examples of the drycoating method may include vacuum evaporation, chemical vapor deposition (CVD), etc, and examples of the wetcoating method may include impregnation, spray, etc. For example, a core particle 110 coated with carbon nanoparticles 120 is first coated with carbon precursors (such as coal based pitch, mesophase pitch, petroleum based pitch, coal based oil, petroleum based heavy oil, organic synthetic pitch, or polymer resins including phenolic resins, furan resins, polyamide resins, etc,) and the core particle 110 that is coated with carbon nanoparticles 120 and then coated with the carbon precursors is heat-treated such that an amorphous carbonaceous coating layer 130 may be formed.

According to one or more exemplary embodiments, the amorphous carbonaceous coating layer 130 may have a thickness range of about 0.1 μm to about 10 μm. For example, the amorphous carbonaceous coating layer 130 may have a thickness range of about 50 nm to about 5 μm, or about 10 nm to about 1 μm. Within the thickness ranges described above, the amorphous carbonaceous coating layer 130 may not deteriorate (i.e., may maintain) capacity of a battery while providing a sufficient conducting path between negative active material particles.

According to one or more exemplary embodiments, the amorphous carbonaceous coating layer 130 may be included in a range of about 1 part by weight to about 30 parts by weight based on 100 parts by weight of the core particle. For example, the amorphous carbonaceous coating layer 130 may be included in a range of about 5 parts by weight to about 25 parts by weight based on 100 parts by weight of the core particle.

Hereinafter, a method of preparing a negative active material including the silicon based alloy is described.

A method of preparing a negative active material according to one or more exemplary embodiments includes: mixing carbon nanoparticles with a core particle including a silicon based alloy to obtain a first particle in which the carbon nanoparticles are adhered onto the surface of the core particle; mixing the first particle with an amorphous carbon precursor to obtain a second particle in which the amorphous carbon precursor is coated on the surface of the first particle; and heat-treating the second particle at a temperature ranging from about 500° C. to about 700° C. in an inert atmosphere.

According to one or more exemplary embodiments, the silicon based alloy may be represented by the following Formula 1:

   Formula 1 wherein, M includes at least one selected from group 2 to 14 metal elements except silicon, and wherein 0.5≤a≤0.9, 0.1≤b≤0.5, and a+b=1.

According to one or more exemplary embodiments, M may include at least one selected from iron (Fe), copper (Cu), magnesium (Mg), chromium (Cr), nickel (Ni), zinc (Zn), manganese (Mn), cobalt (Co), titanium (Ti), germanium (Ge), calcium (Ca), and aluminum (Al).

According to one or more exemplary embodiments, the silicon based alloy may be represented by $Si_aFe_b$, wherein 0.5≤a≤0.9, 0.1≤b≤0.5, and a+b=1.

For example, the carbon nanoparticles 120 according to one or more exemplary embodiments may be amorphous carbon particles having a size (e.g., nanosize) of about 100 nm or less, or about 10 nm to about 100 nm. The amorphous carbon particles are in a state of powder (e.g., powders), which are the materials remained after primarily processing crude oil and/or coal, from which a substantial amount of organic material has been removed by performing the purification process several times. For example, the carbon nanoparticles 120 may include an amorphous carbon formed utilizing crude oil, natural gas, acetylene gas, etc. In one embodiment, the carbon nanoparticles 120 may include carbon black obtained by spraying and vaporizing crude oil, natural gas, acetylene gas, etc at a temperature of about 1600° C. to about 2000° C. The carbon nanoparticles are mixed with the core particle including the silicon based alloy to obtain the first particle in which the carbon nanoparticles are adhered to the surface of the core particle including the silicon based alloy by a physical mixing-and-coating method.

After obtaining the first particle in which the carbon nanoparticles are adhered to the surface of the core particle including the silicon based alloy, the first particle is mixed with an amorphous carbon precursor to obtain the second particle in which the amorphous carbon precursor is coated on the surface of the first particle.

According to one or more exemplary embodiments, the amorphous carbon precursor may include a carbon precursor selected from hydrocarbons, soft carbons, hard carbons, coal, coal based pitch, petroleum based pitch, mesophase pitch, coal based oil, petroleum based heavy oil, organic synthetic pitch, and combinations thereof.

Although methods for coating the amorphous carbon precursor are not limited, the methods may include both a dry coating method and a wet coating method. Examples of the dry coating method may include vacuum evaporation, CVD, etc, and examples of the wet coating method may include impregnation, spray, etc.

The second particle coated with the amorphous carbon precursor is heat-treated in a temperature range of about 500° C. to about 700° C., e.g., about 500° C. to about 600° C., in a nitrogen atmosphere such that an amorphous carbonaceous coating layer may be formed. The content of the active silicon may be sufficiently secured in the temperature range described above.

A lithium battery according to another embodiment of the present disclosure includes the above-described negative active material in a negative electrode.

According to one or more exemplary embodiments, the lithium battery includes: a negative electrode including the above-described negative active material; a positive electrode disposed oppositely to the negative electrode; and an electrolyte disposed between the negative electrode and the positive electrode.

The negative electrode includes the above-described negative active material. For example, the negative electrode may be manufactured by a method of forming the negative active material composition into a set or predetermined shape, or coating the negative active material composition on a current collector such as a copper foil after preparing a negative active material composition by mixing the above-described negative active material, a binder, and optionally (e.g., selectively) a conducting agent in a solvent.

The negative electrode may additionally include a related art negative active material usually utilized as a negative active material for a lithium battery in the art besides the above-described negative active material. Examples of the related art utilized negative active material may include one or more selected from lithium metal, metals alloyable with lithium, transition metal oxides, non-transition metal oxides, and carbonaceous materials.

Examples of the metals alloyable with lithium may include Si, Sn, Al, Ge, Pb, Bi, Sb, Si—Y alloys (Y is at least one selected from alkali metals, alkali earth metals, Group 13 elements, Group 14 elements, transition metals, rare earth elements, and combined elements thereof, and Y is not Si), Sn—Y alloys (Y is at least one selected from alkali metals, alkali earth metals, Group 13 to 16 elements, transition metals, rare earth elements, and combined elements thereof, and Y is not Sn), etc. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

Examples of the transition metal oxides may include lithium titanium oxides, vanadium oxides, lithium vanadium oxides, etc.

Examples of the non-transition metal oxides may include $SnO_2$, $SiO_x$ ($0<x<2$), etc.

Examples of the carbonaceous materials may include crystalline carbons, amorphous carbons, and mixtures thereof. Examples of the crystalline carbons may include graphites such as amorphous (e.g., irregular-shaped), plate-shaped, flake-shaped, spherical or fibrous natural graphites or artificial graphites. Examples of the amorphous carbons may include soft carbons (carbons calcined at low temperatures), hard carbons, mesophase pitch carbides, calcined coke, etc.

When the carbonaceous materials are utilized along with the above-described negative active material, the oxidation reaction of silicon based alloys is suppressed, and a solid electrolyte interface (SEI) film is effectively formed such that charge/discharge characteristics of lithium may be further improved by forming a stable coating film and the electrical conductivity may be further improved.

Related art negative active materials may be utilized in a form that the related art negative active materials are mixed and blended with the above-described negative active material, in a form that the related art negative active materials are coated on the surface of the above-described negative active material, or in an optionally combined form thereof.

As a binder utilized in the negative active material composition, a component which helps in bonding a negative active material, a conducting agent, a current collector, etc., to one another is added in a range of about 1 part by weight to about 50 parts by weight based on 100 parts by weight of the negative active material. For example, the binder may be added in a range of about 1 part by weight to about 30 parts by weight, about 1 part by weight to about 20 parts by weight, or about 1 part by weight to about 15 parts by weight based on 100 parts by weight of the negative active material. Examples of such a binder may include polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenolic resin, epoxy resin, polyethylene terephthalate, polytetrafluoroethylene, polyphenylene sulfide, polyamide imide, polyetherimide, polyethersulfone, polyamide, polyacetal, polyphenylene oxide, polybutylene terephthalate, ethylene-propylene-diene terpolymer (EPDM), sulfonated EPDM, styrene butadiene rubber, fluorinated rubber, various suitable copolymers, etc.

Additionally, the negative electrode may optionally (e.g., selectively) include a conducting agent to further improve the electrical conductivity by providing the above-described negative active material with a conducting path. Any suitable conducting materials utilized in lithium batteries may be generally utilized as the conducting agent, and examples of the conducting agent may include conducting materials including: carbonaceous materials such as carbon black, acetylene black, Ketjen black, carbon fibers (e.g., vapor-grown carbon fibers), etc; metal based materials such as powders or fibers of metals including copper, nickel, aluminum, silver, etc; conducting polymers such as polyphenylene derivatives, etc; and mixtures thereof. The conducting agent may be utilized in a state that the content of the conducting agent is appropriately adjusted. For example, the negative active material and the conducting agent may be added in a weight ratio range of about 99:1 to about 90:10.

N-methylpyrrolidone (NMP), acetone, water, etc. may be utilized as the solvent. The solvent may be included in a range of about 1 part by weight to about 100 parts by weight based on 100 parts by weight of the negative active material. When the solvent is included in the range described above, an operation for forming an active material layer is easily carried out.

Further, the current collector generally has a thickness of about 3 μm to about 500 μm. Materials for the current collector are not particularly limited if they have suitable conducting properties and do not cause chemical changes to relevant batteries. Examples of the current collector may include copper, stainless steel, aluminum, nickel, titanium, calcined carbon, copper or stainless steel having its surface treated with carbon, nickel, silver and others, and aluminum-cadmium alloys. Further, binding power of the negative active material may be strengthened by forming minute prominences and depressions on the surface of the current collector, and the current collector may be utilized in various suitable forms including a film, a sheet, a foil, a net, a porous body, a foam, a nonwoven fabric body, etc.

A prepared negative active material composition may be directly coated on a current collector to manufacture a negative electrode plate. Alternatively, the prepared negative active material composition may be cast on a separate support such that a negative active material film delaminated from the support is laminated on a copper foil current collector to obtain the negative electrode plate. The negative electrode is not limited to the above-mentioned methods of preparation, but the negative electrode may be formed in other suitable methods in addition to the above-mentioned methods.

The negative active material composition may be utilized not only in manufacturing electrodes for lithium batteries, but also in manufacturing printable batteries by being printed on flexible electrode substrates.

In addition, a positive active material composition in which a positive active material, a conducting agent, a binder, and a solvent are mixed is prepared to manufacture a positive electrode.

Any suitable materials utilized in the art may be utilized as the positive active material, for example, materials such as lithium-containing metal oxides.

Examples of the positive active material may include compounds represented by any one formula selected from: $Li_aAl_{1-b}L_bD_2$ (wherein, $0.90 \leq a \leq 1.8$ and $0 \leq b \leq 0.5$); $Li_aE_{1-b}L_bO_{2-c}D_c$ (wherein, $0.90 \leq a \leq 1.8$, $0 \leq b \leq 0.5$, and $0 \leq c \leq 0.05$); $LiE_{2-b}L_bO_{4-c}D_c$ (wherein, $0 \leq b \leq 0.5$ and $0 \leq c \leq 0.05$); $Li_aNi_{1-b-c}Co_bL_cD_\alpha$ (wherein, $0.90 \leq a \leq 1.8$, $0 \leq b \leq 0.5$, $0 \leq c \leq 0.05$, and $0 \leq \alpha \leq 2$); $Li_aNi_{1-b-c}Co_bL_cO_{2-\alpha}M_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Co_bL_cO_{2-\alpha}M_2$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bL_cD_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bL_cO_{2-\alpha}M_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bL_cO_{2-\alpha}M_2$ (wherein, $0.90 \leq a \leq 1.8$, $0 \leq b \leq 0.5$, $0 \leq c \leq 0.05$, and $0 < \alpha < 2$); $Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein, $0.90 \leq a \leq 1.8$ and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \leq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiRO_2$; $LiNiVO_4$; $Li_{(3-f)}J_2(PO_4)_3$ (wherein, $0 \leq f \leq 2$); $Li_{(3-f)}Fe_2(PO_4)_3$ (wherein, $0 \leq f \leq 2$); and $LiFePO_4$.

In the formulas, A is Ni, Co, Mn, or combinations thereof; L is Al, Ni, Co, Mn, Cr, Fe, Mg, Sr, V, rare earth elements, or combinations thereof; D is O, F, S, P, or combinations thereof; E is Co, Mn, or a combination thereof; M is F, S, P, or combinations thereof; G is Al, Cr, Mn, Fe, Mg, La, Ce, Sr, V, or combinations thereof; Q is Ti, Mo, Mn, or combinations thereof; R is Cr, V, Fe, Sc, Y, or combinations thereof; and J is V, Cr, Mn, Co, Ni, Cu, or combinations thereof.

Examples of the positive active material may include the compounds having coating layers formed on surfaces thereof, and mixtures of the compounds and the compounds having coating layers formed on surfaces thereof. The coating layers may include coating element compounds including: oxides and/or hydroxides of the coating elements; oxyhydroxides of the coating elements; oxycarbonates of the coating elements; and hydroxyl carbonates of the coating elements. Compounds included in the coating layers may be amorphous or crystalline. Examples of the coating elements included in the coating layers may include Mg, Al, Co, K, Na, Ca, Si, Ti, V, Sn, Ge, Ga, B, As, Zr, and mixtures thereof. Any suitable coating methods may be utilized in the process of forming the coating layers, which may include coating the compounds with such elements by methods such as spray coating, dipping, etc., and which may not adversely affect physical properties of a positive active material. Detailed description on the coating methods is not repeated herein since the coating methods are contents that may be understood by those of ordinary skill in the art.

Examples of the positive active material may include $LiNiO_2$, $LiCoO_2$, $LiMn_xO_{2x}$ (wherein, x=1 and 2), $LiNi_{1-x}Mn_xO_2$ (wherein, $0<x<1$), $LiNi_{1-x-y}Co_xMn_yO_2$ (wherein, $0\leq x\leq 0.5$ and $0\leq y\leq 0.5$), $LiFeO_2$, $V_2O_5$, TiS, and MoS.

The same conducting agent, binder and solvent as those in the above-described negative active material composition may be utilized in the positive active material composition. According to circumstances, a plasticizer may be additionally added to the positive active material composition and the negative active material composition to enable pores to be formed in an electrode plate. The positive active material, conducting agent, binder and solvent may be included in amount levels that are usually utilized in lithium batteries.

The positive electrode current collector (as a current collector having a thickness of about 3 μm to about 500 μm) is not particularly limited if the positive electrode current collector has high conducting properties while it does not cause chemical changes in the relevant batteries. Examples of the positive electrode current collector may include stainless steel, aluminum, nickel, titanium, calcined carbon, and aluminum and/or stainless steel having its surface treated with carbon, nickel, titanium, and/or silver. The current collector may have minute prominences and depressions formed on its surface to increase the adhesive strength of the positive active material, and the current collector may be formed in various suitable forms including a film, a sheet, a foil, a net, a porous body, a foam, a nonwoven fabric body, etc.

A prepared positive active material composition may be directly coated and dried on a positive electrode current collector to manufacture a positive electrode plate. Alternatively, after the positive active material composition is cast on a separate support, a positive active material film delaminated from the support may be laminated on a positive electrode current collector to manufacture a positive electrode plate.

The positive electrode and the negative electrode may be separated by a separator, and any suitable material usually utilized in lithium batteries may be utilized as the separator. For example, materials having suitable (e.g., excellent) electrolytic solution-containing capabilities as well as low resistance values with respect to movements of electrolyte ions are appropriate. Examples of the separator may include one or more materials selected from glass fibers, polyesters, Teflon, polyethylene, polypropylene, polytetrafluoroethylene (PTFE), and combinations thereof, and the separator may be present in the form of a nonwoven fabric or a woven fabric. The separator generally has a pore diameter of about 0.01 μm to about 10 μm, and a thickness of about 5 μm to about 300 μm.

A nonaqueous electrolyte includes (e.g., consists of) a nonaqueous electrolyte medium and lithium salts. Examples of the nonaqueous electrolyte medium may include a nonaqueous electrolytic solution, a solid electrolyte, an inorganic solid electrolyte, etc.

Examples of the nonaqueous electrolytic solution may include aprotic organic solvents including N-methyl-2-pyrrolidone, propylene carbonate, ethylene carbonate, butylenes carbonate, dimethyl carbonate, diethyl carbonate, gamma-butyrolactone, 1,2-dimethoxy ethane, tetrahydrofuran, 2-methyl tetrahydrofuran, dimethyl sulfoxide, 1,3-dioxolane, formamide, dimethylformamide, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

Examples of the organic solid electrolyte may include polyethylene derivatives, polyethylene oxide derivatives, polypropylene oxide derivatives, ester phosphate polymers, poly agitation lysine, polyester sulfide, polyvinyl alcohol, polyvinylidene fluoride, dissociable ionic group-including polymers, etc.

Examples of the inorganic solid electrolyte may include lithium nitrides, lithium halides, and lithium sulfates, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

Any suitable lithium salts usually utilized in lithium batteries may be utilized. Examples of the lithium salts as materials that are well dissolved into the nonaqueous electrolyte may include one or more of materials selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carboxylates, lithium tetraphenyl borates, imide, etc.

Lithium batteries may be categorized into lithium ion batteries, lithium ion polymer batteries, and lithium polymer batteries according to the separators and electrolytes utilized in the lithium batteries. The lithium batteries may be categorized into cylindrical, rectangular, coin-type, pouch-type, and other-type batteries (e.g., coin, pouch, and other kinds of batteries) according to the forms of (e.g., shapes of) the lithium batteries. The lithium batteries may be categorized into bulk-type and thin film-type batteries (e.g., bulk batteries and thin film batteries) according to sizes of the lithium batteries. Further, the lithium batteries may also be categorized into lithium primary batteries and lithium secondary batteries.

Because methods for manufacturing these batteries are known in the art, detailed descriptions on the methods are not repeated herein.

Figure 2:
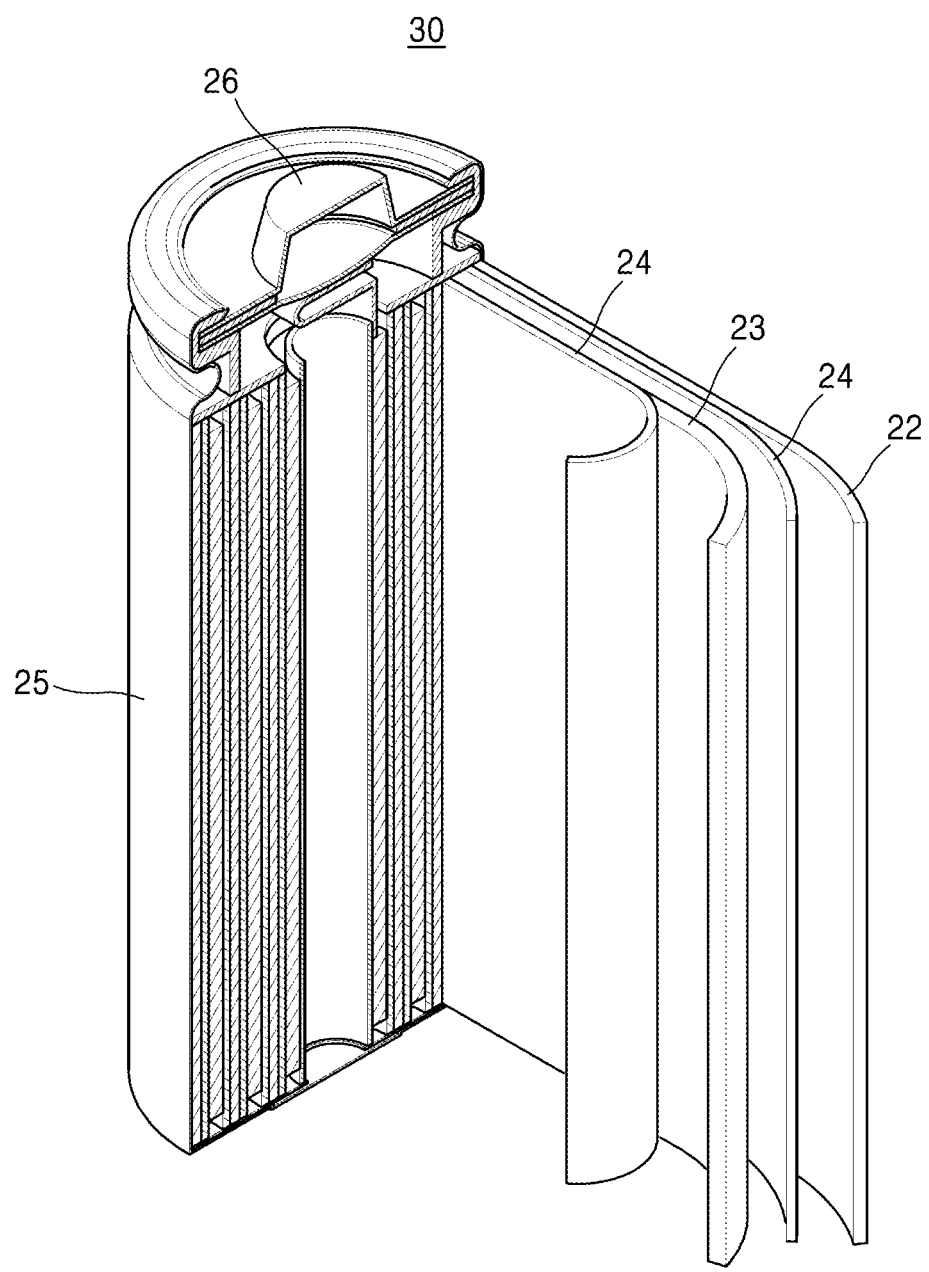
FIG. 2 is a schematic view showing a lithium battery according to one or more exemplary embodiments.

FIG. 2 schematically illustrates a representative structure of a lithium battery according to one or more exemplary embodiments of the present disclosure.

Referring to FIG. 2, the lithium battery 30 may include a positive electrode 23, a negative electrode 22, and a separator 24 between the positive electrode 23 and the negative electrode 22. The positive electrode 23, negative electrode 22, and separator 24 are wound or folded before they are accommodated into a battery case 25. Subsequently, an electrolyte is injected into the battery case 25, and the battery case 25 containing the electrolyte is sealed by a sealing member 26 to complete a lithium battery 30. Examples of the battery case 25 may include a cylindrical battery case, a rectangular battery case, a thin film battery case, etc. The lithium battery may be a lithium ion battery.

The lithium battery may be utilized in battery modules including a plurality of batteries as the unit batteries for medium- or large-sized devices, as well as in batteries utilized as power sources for small devices such as existing cellular phones, portable computers, etc.

Examples of the medium- or large-sized devices may include: power tools; eEVs including electric vehicles (EVs), hybrid electric vehicles (HEVs), and plug-in hybrid electric vehicles (PHEVs); electric two-wheeled vehicles including E-bikes and E-scooters; electric golf carts; electric trucks; electric commercial vehicles; electric power storage systems; etc. However, the medium- or large-sized devices are not limited to the examples of the medium- or large-sized devices. Further, lithium battery may be utilized in all other uses requiring high output powers, high voltages, and high temperature driving.

Hereinafter, exemplary embodiments of the present disclosure are described in more detail through the following Examples and Comparative Examples. However, such embodiments are provided for illustrative purposes only, and the scope of the present invention should not be limited thereto in any manner. Further, it should be understood that the present disclosure is not limited to the above descriptions since other various suitable modifications of the present disclosure may occur to persons having ordinary knowledge in the related art of the present disclosure.

Preparation of Negative Active Materials, and Manufacturing of Lithium Batteries Comparative Example 1

After first mixing Si with Fe at a mixing ratio of 80 at % and 20 at % respectively, the mixture was injected into a vacuum induction melting furnace manufactured by Yein Tech Co. Ltd of South Korea, and a mother alloy was manufactured by melting the mixture under vacuum in order to suppress (e.g., maximally suppress) the oxidation of the mixture due to the atmosphere.

After crushing such manufactured mother alloy into a large bulk state (e.g., form), the crushed mother alloy was injected into an injection pipe manufactured by Yein Tech Co. Ltd of South Korea, high-frequency induction heating was performed on the crushed mother alloy in an argon gas atmosphere to melt the mother alloy, and the molten mother alloy was sprayed on a Cu wheel rotated through a nozzle such that the alloy was injected and rapidly solidified in the form of a ribbon.

An Si alloy powder having an average particle diameter D50 of 1 μm to 5 μm was obtained by milling the produced alloy ribbon for a suitable period of time (e.g., a long time) utilizing a high energy ball mill, thereby performing grain refining and amorphization of the alloy ribbon.

A coin cell was manufactured by the following process utilizing such prepared Si alloy powder as a negative active material.

A negative active material slurry was prepared by mixing the Si alloy powder as a negative active material, polyamide imide as a binder, and Ketjen black and graphite as conducting agents at a weight ratio of 80:8:2:10, and adding N-methylpyrrolidone for adjusting the viscosity to the mixture such that solids were included in the mixture in the amount of 60% by weight. The prepared slurry was coated on a copper foil current collector having a thickness of 10 μm to manufacture a negative electrode plate. After drying the coated negative electrode plate at 110° C. for 15 minutes, the dried negative electrode plate was rolled (e.g., compressed) such that the negative electrode plate had a density value of 1.5 g/cc. After heat-treating the dried negative electrode plate under vacuum at 350° C. for one hour, the heat-treated negative electrode plate was cut to a size of 16 mm such that a negative electrode to be applied to the coin cell was manufactured. Li metal was utilized as a counter electrode, a polypropylene separator Celgard 3501 having a thickness of 20 μm was utilized, and a 2016 coin cell in which an electrolytic solution was injected and compressed was manufactured. The electrolyte was prepared by dissolving $LiPF_6$ into a mixed solvent in which ethylene carbonate (EC), diethyl carbonate (DEC), and fluoroethylene carbonate (FEC) were mixed at a volume ratio of 3:3:4, such that $LiPF_6$ had a concentration of 1.10 M.

Comparative Example 2

A Si alloy powder was prepared by mixing 100 parts by weight of the Si alloy powder obtained in the Comparative Example 1 with 3 parts by weight of conductive carbon black having an average particle diameter of 30 nm to 50 nm (SuperP manufactured by TIMCAL Graphite & Carbon), and adhering the mixture to the surface of carbon nanoparticles utilizing a powder coating machine (Mechanofusion).

A coin cell was manufactured by utilizing the prepared Si alloy powder as a negative active material, and performing the same process as in the Comparative Example 1.

Example 1

Pitch coating was performed on the surface of the carbon nanoparticle-adhered Si alloy powder obtained in Comparative Example 2 utilizing 3% by weight of coal tar pitch based on 100% by weight of the total active material. A negative active material was prepared by heat-treating the pitch coated Si alloy powder at 500° C. under nitrogen atmosphere.

A coin cell was manufactured by utilizing the negative active material, and performing the same process as in the Comparative Example 1.

Example 2

Pitch coating was performed on the surface of the carbon nanoparticle-adhered Si alloy powder obtained in Comparative Example 2 utilizing 5% by weight of coal tar pitch based on 100% by weight of the total active material. A negative active material was prepared by heat-treating the pitch coated Si alloy powder at 600° C. under nitrogen atmosphere.

A coin cell was manufactured by utilizing the negative active material, and performing the same process as in the Comparative Example 1.

Evaluation Example 1

Phase Analyses of Si Alloy Powder

Figure 7:
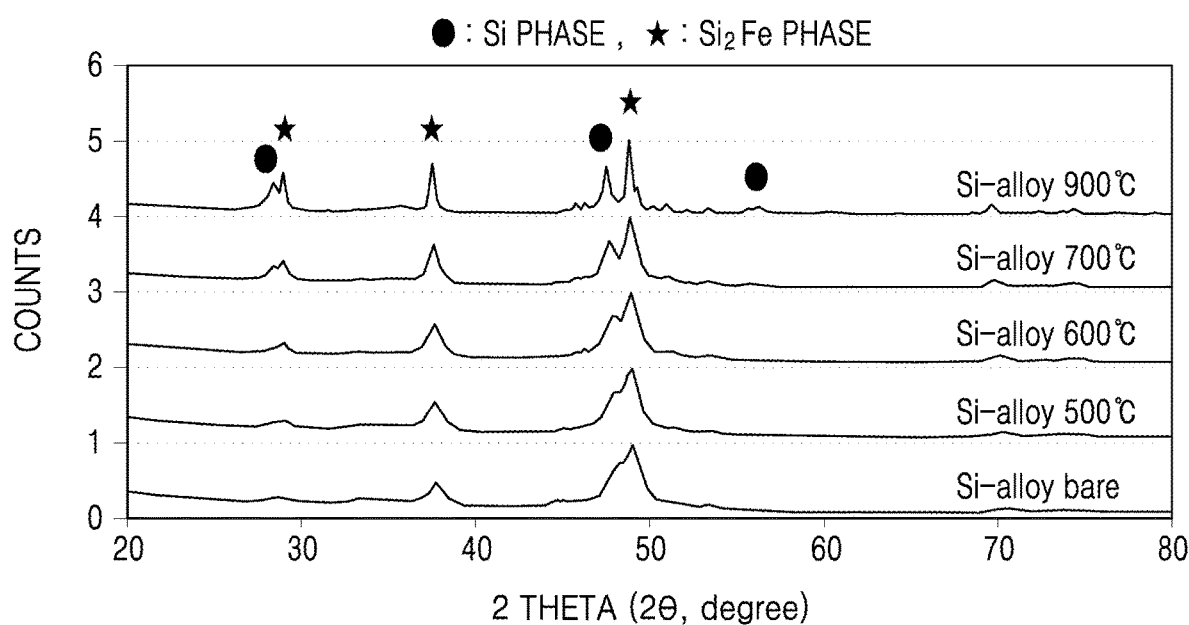
FIG. 7 shows results of measuring X-ray diffraction patterns of negative active materials obtained with heat treatment temperatures of the Si alloy powder respectively at 500° C., 600° C., 700° C., and 900° C.

Results of analyzing phase analyses of the Si alloy powder prepared in Comparative Example 1 utilizing an X-ray diffractometer (XRD) manufactured by PANalytical X'pert PRO MPD were represented in FIG. 7. The test condition was a CuK-alpha characteristic X-ray with a wavelength of 1.541 Å.

As shown in FIG. 7, only an $Si_2Fe$ phase in the Si alloy powder of Comparative Example 1 was represented as an inert phase. 40 atomic % of Si that could not form an inactive matrix as represented forms an active phase, and this became the Si that could be bonded with Li ions.

Further, a composition ratio of the Si alloy powder prepared in Comparative Example 1 is presented in the following Table 1.

TABLE 1

|  | Composition ratio (at %) | | Active Si (at %) | Inert $Si_2Fe$ phase (at %) |
| --- | --- | --- | --- | --- |
|  | Si | Fe |  |  |
| Comparative Example 1 | 80 | 20 | 40 | 60 |

Evaluation Example 2

FE-SEM Image Analyses of Negative Active Materials

Coated states of the negative active materials prepared in Comparative Example 2 and Example 1 were checked utilizing a field emission scanning electron microscope (FE-SEM). An FE-SEM photograph of the negative active material prepared in Comparative Example 2 was shown in FIG. 3A, and an FE-SEM photograph of the negative active material prepared in Example 1 was shown in FIG. 3B.

Figure 3A:
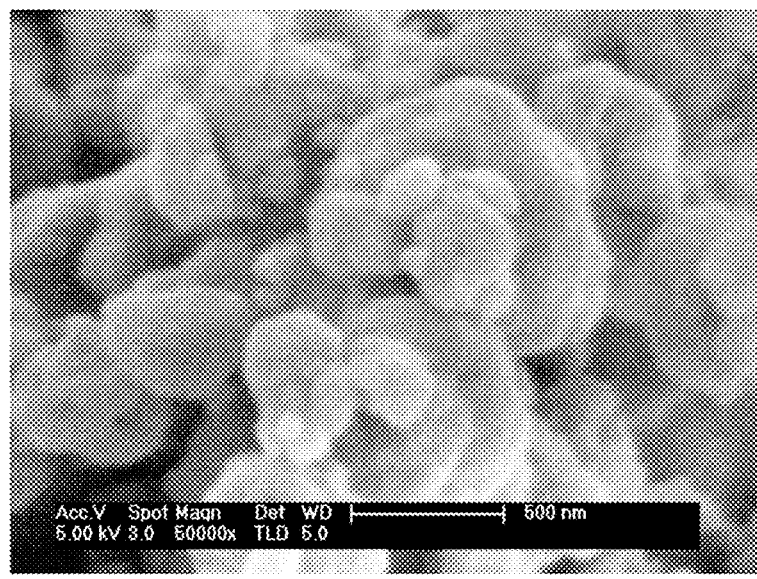
FIG. 3A is a photograph of a field emission scanning electron microscope (FE-SEM) showing a negative active material prepared in Comparative Example 2.
Figure 3B:
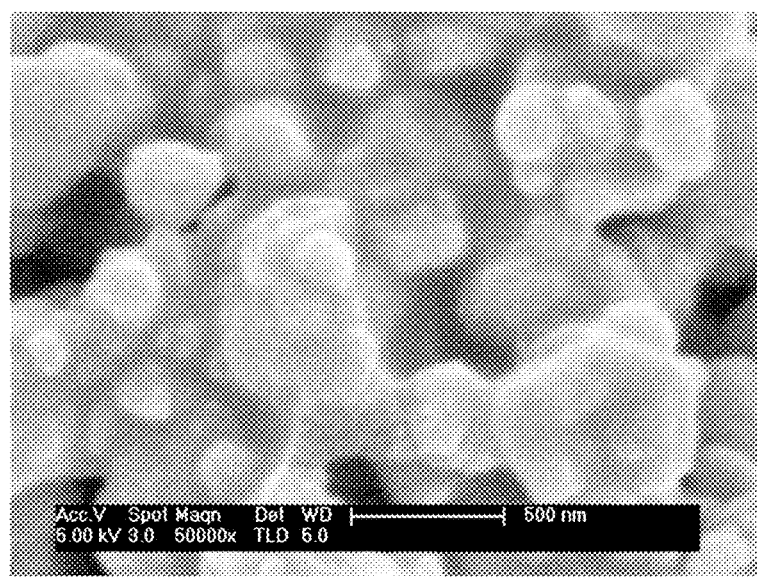
FIG. 3B is a photograph of an FE-SEM showing a negative active material prepared in Example 1.

As shown in FIG. 3A and FIG. 3B, it can be seen that the negative active material prepared in Example 1 has the pitch coating layer formed on the surface of the negative active material prepared in Comparative Example 2.

Evaluation Example 3

Analysis Utilizing High Resolution Transmission Electron Microscope (HRTEM)

Figure 4:
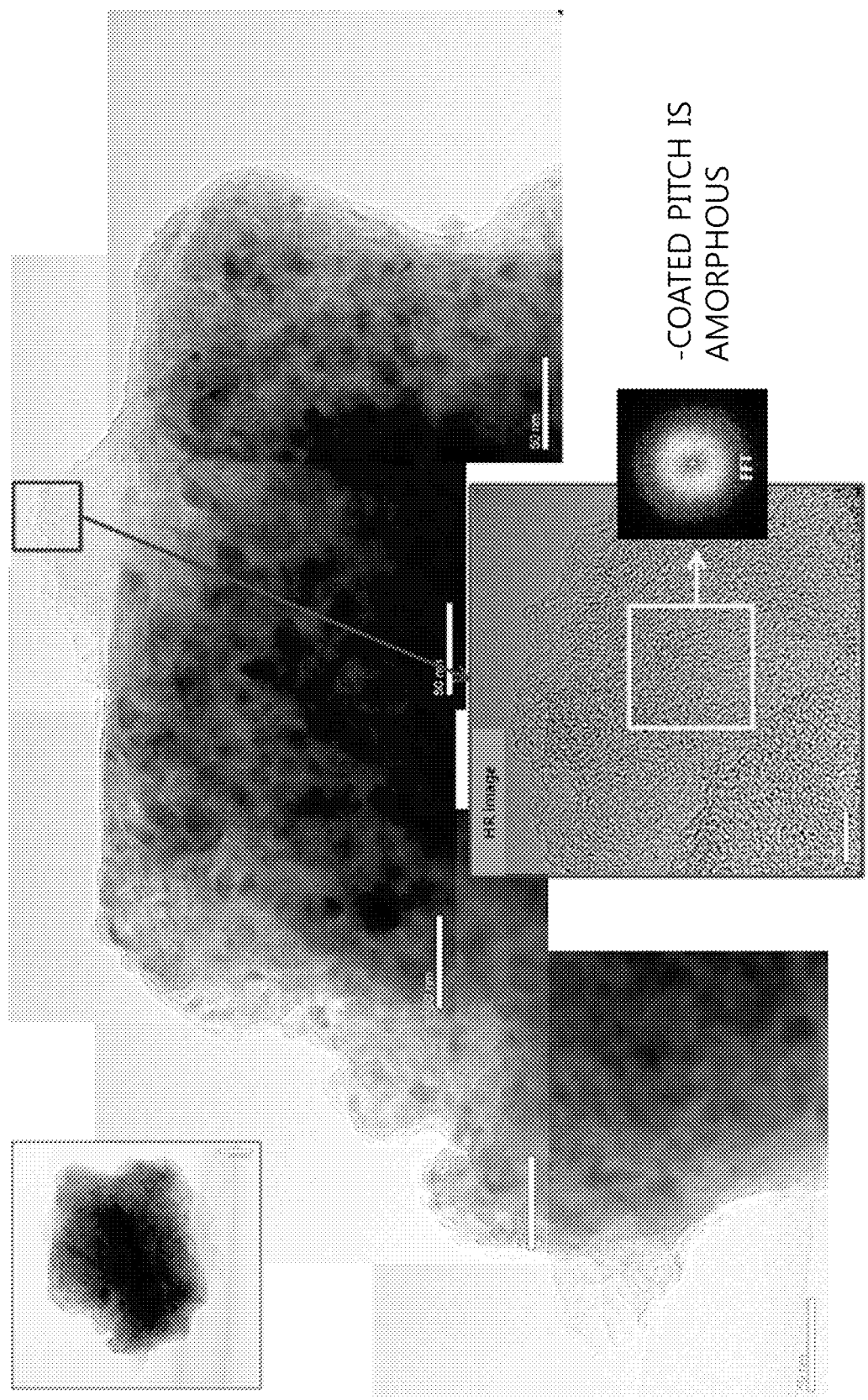
FIG. 4 is a photograph of a high resolution transmission electron microscope (HRTEM) for analyzing crystallographic characteristics of an amorphous carbonaceous coating layer portion of a negative active material prepared in Example 1.

In order to analyze the crystallographic characteristics of the pitch coating layer in the negative active material prepared in Example 1, an HRTEM analysis process was performed utilizing an HRTEM, and results of the analysis process were shown in FIG. 4.

As shown in FIG. 4, the results of the HRTEM analysis confirms that the pitching coating layer coated on the surface of Si particle powder in the negative active material prepared in Example 1 was amorphous.

Evaluating Lifetime Characteristics of Cells

Capacity retention rates (CRRs) of the coin cells manufactured in Comparative Examples 1 and 2 and Examples 1 and 2 were analyzed through 0.5 C charge and 1.0 C discharge. The CRR is defined by the following Mathematical Expression 1.

CRR [%]=[discharge capacity at each cycle/discharge capacity at the first cycle]×100   Mathematical Expression 1

Figure 5:
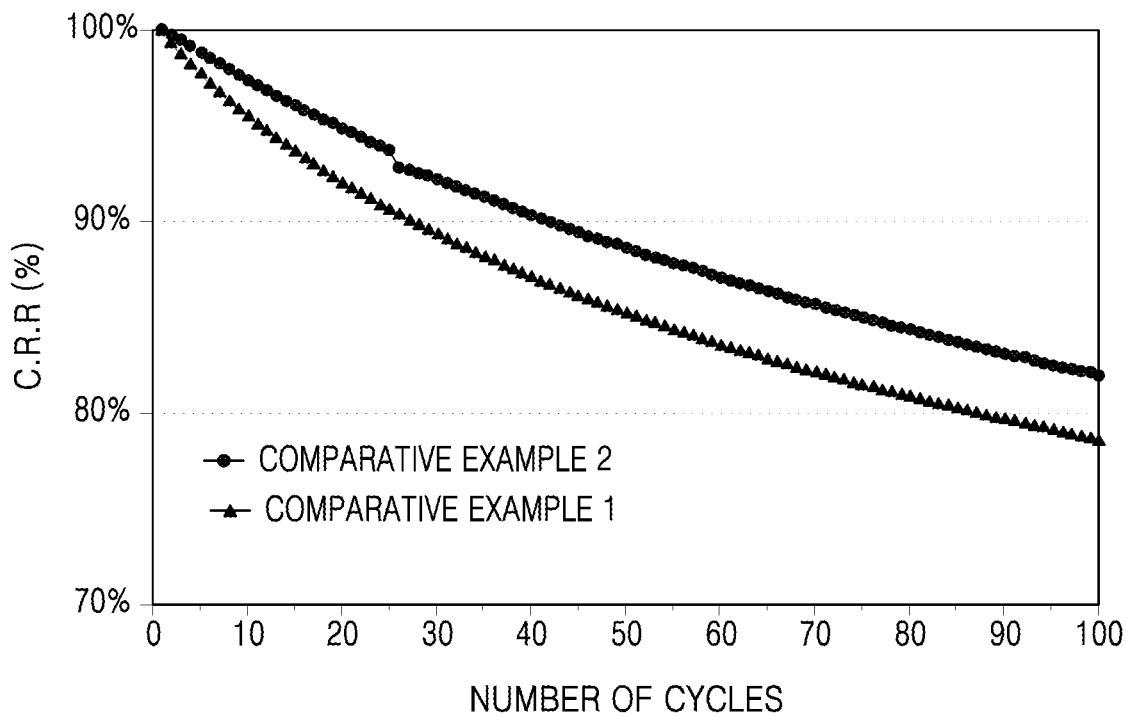
FIG. 5 shows results of discharge capacity retention rate-measurement of lithium batteries manufactured in Comparative Examples 1 and 2.

First, in order to check the coating effect of SuperP, results of measuring CRRs at the respective cycles of the coin cells manufactured in Comparative Examples 1 and 2 are presented in FIG. 5.

As shown in FIG. 5, it can be seen that a CRR of the coin cell was higher when using a negative active material in which SuperP was coated on the surface of the Si alloy powder than when using a negative active material in which no such coating was coated on the surface of an Si alloy powder. It can be seen through this that lifetime characteristics of lithium batteries may be improved when applying the negative electrode in which carbon nanoparticles are adhered to the surface of the Si alloy powder.

Figure 6:
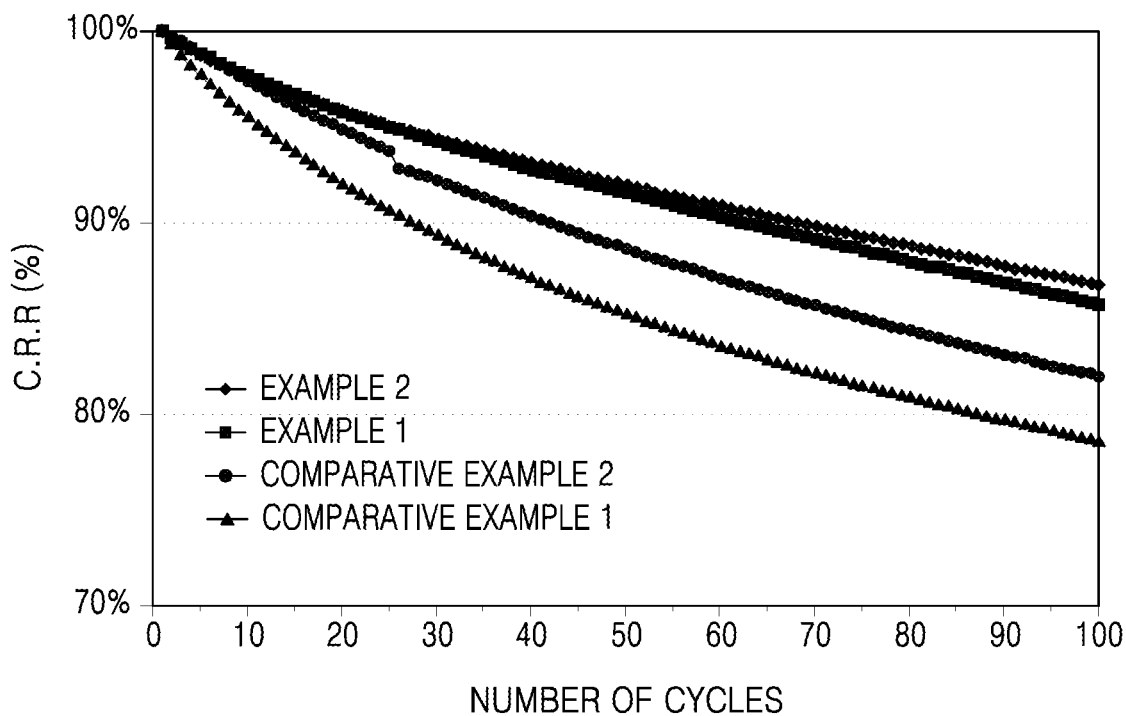
FIG. 6 shows results of discharge capacity retention rate-measurement of lithium batteries manufactured in Examples 1 and 2, and Comparative Examples 1 and 2.

Further, results of measuring CRRs at the respective cycles of the coin cells manufactured in Comparative Examples 1 and 2, and Examples 1 and 2 are presented in FIG. 6.

As shown in FIG. 6, it can be seen that CRRs of lithium batteries are further improved with negative active materials in which a pitch coating layer was additionally formed on the SuperP coating layer (after coating SuperP on the surface of an Si alloy powder to form a SuperP coating layer).

Evaluation Examples 5

Analyzing Changes in Crystal Structures of Negative Active Materials According to Heat Treatment Temperatures In order to observe changes in crystal structures of negative active materials according to heat treatment temperatures, the negative active materials in the state that SuperP was coated on the surface of an Si alloy powder were prepared as in Example 1 while varying the heat treatment temperatures to 500° C., 600° C., 700° C., and 900° C.

Results of measuring X-ray diffraction patterns of the respective negative active materials are presented in FIG. 7.

As shown in FIG. 7, phase variations begin when the heat treatment temperatures increase. As the heat treatment temperatures increase, Si crystallinities increase and problems such as a reduction in the reversible active Si due to the formation of phases of $Si_5Fe_2$, $Si_7Fe_3$, etc. may occur.

As described above, the negative active material according to one or more exemplary embodiments may improve the lifetime characteristics of the lithium batteries.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

The use of "may" when describing embodiments of the present invention refers to "one or more embodiments of the present invention." Also, the term "exemplary" is intended to refer to an example or illustration. As used herein, the term "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. §112, first paragraph, or 35 U.S.C. §112(a), and 35 U.S.C. §132(a).

While one or more exemplary embodiments have been described with reference to the figures, it will be understood by those of ordinary skill in the art that various changes in form and details may be made therein without departing from the spirit and scope as defined by the following claims, and equivalents thereof.

What is claimed is:

1. A negative active material, comprising:
a plurality of core particles, each core particle comprising a silicon based alloy,
wherein the silicon based alloy comprises
an inactive matrix consisting of inactive silicon and at least one selected from the group consisting of group 2 to 14 metal elements other than silicon, and
a plurality of active silicon nanoparticles dispersed in the inactive matrix;
amorphous carbon nanoparticles on a surface of the core particle, the amorphous carbon nanoparticles having an average particle diameter of about 10 nm or more and less than 100 nm; and
an amorphous carbonaceous coating layer on at least a portion of the surface of the core particle, the amorphous carbonaceous coating layer covering the amorphous carbon nanoparticles,
wherein the amorphous carbonaceous coating layer surrounds the surface of the core particle and covers the amorphous carbon nanoparticles, and
wherein an average particle diameter of the core particle is greater than an average particle diameter of the amorphous carbon nanoparticles, the core particle being greater in amount than that of the amorphous carbon nanoparticles in combination with the amorphous carbonaceous coating layer.

2. The negative active material of claim 1, wherein the carbon nanoparticles have an average particle diameter of about 1/10 or less of that of the core particle.

3. The negative active material of claim 1, wherein the amorphous carbon nanoparticles have an average particle diameter ranging from about 1/1000 to about 1/10 of that of the core particle.

4. The negative active material of claim 1, wherein the amorphous carbon nanoparticles have an average particle diameter ranging from about 1/1000 to about 1/100 of that of the core particle.

5. The negative active material of claim 1, wherein the core particle has an average particle diameter ranging from about 1 μm to about 10 μm.

6. The negative active material of claim 1, wherein the silicon based alloy is represented by the following Formula 1:

$$Si_aM_b \quad \text{Formula 1}$$

wherein, M comprises at least one selected from the group consisting of group 2 to 14 metal elements other than silicon, and wherein $0.5 \leq a \leq 0.9$, $0.1 \geq b \geq 0.5$, and $a+b=1$.

7. The negative active material of claim 6, wherein M comprises at least one selected from the group consisting of iron (Fe), copper (Cu), magnesium (Mg), chromium (Cr), nickel (Ni), zinc (Zn), manganese (Mn), cobalt (Co), titanium (Ti), germanium (Ge), calcium (Ca), and aluminum (Al).

8. The negative active material of claim 1, wherein the silicon based alloy is represented by $Si_aFe_b$, wherein $0.5 \leq a \leq 0.9$, $0.1 \leq b \leq 0.5$, and $a+b=1$.

9. The negative active material of claim 1, wherein an amount of the active silicon nanoparticles in the silicon based alloy is about 30 atomic % to about 50 atomic % based on a total atomic percent of the silicon based alloy.

10. The negative active material of claim 1, wherein the active silicon nanoparticles have an average particle diameter ranging from 1 nm to about 100 nm.

11. The negative active material of claim 1, wherein the inactive matrix comprises $Si_2Fe$.

12. The negative active material of claim 1, wherein the amorphous carbonaceous coating layer comprises a carbide of a carbon precursor selected from the group consisting of hydrocarbons, soft carbons, hard carbons, coal, coal based pitch, petroleum based pitch, mesophase pitch, coal based oil, petroleum based heavy oil, organic synthetic pitch, and combinations thereof.

13. The negative active material of claim 1, wherein the amorphous carbonaceous coating layer has a thickness of about 0.1 μm to about 10 μm.

14. The negative active material of claim 1, wherein an amount of the amorphous carbonaceous coating layer is about 1 part to about 30 parts based on 100 parts by weight of the core particle.

15. A lithium battery comprising the negative active material of claim 1.

16. A method of preparing the negative active material of claim 1, the method comprising:
mixing the amorphous carbon nanoparticles with the plurality of core particles comprising the silicon based alloy to obtain a plurality of first particles in which the amorphous carbon nanoparticles are adhered to the surface of each of the core particles;
mixing the plurality of first particles with an amorphous carbon precursor to obtain a plurality of second particles in which the amorphous carbon precursor is coated on a surface of each of the first particles; and
heat-treating the plurality of second particles at a temperature of about 500° C. to about 700° C. in an inert atmosphere.

17. The method of claim 16, wherein the heat-treating of the second particle is performed at a temperature of about 500° C. to about 600° C. in a nitrogen atmosphere.

* * * * *

UNITED STATES PATENT AND TRADEMARK OFFICE
CERTIFICATE OF CORRECTION

PATENT NO. : 11,539,043 B2
APPLICATION NO. : 14/817134
DATED : December 27, 2022
INVENTOR(S) : Changsu Shin et al.

It is certified that error appears in the above-identified patent and that said Letters Patent is hereby corrected as shown below:

In the Claims

Column 17, Claim 2, Line 45     After "the" Insert --amorphous--

Column 18, Claim 6, Line 7     Delete "$0.1 \geq b \geq 0.5$,"
Insert --$0.1 \leq b \leq 0.5$,--

Column 18, Claim 12, Line 28     Delete "soft carbons, hard carbons,"
Insert --soft carbons,--

Signed and Sealed this
Twenty-seventh Day of June, 2023

Katherine Kelly Vidal
*Director of the United States Patent and Trademark Office*